(No Model.)

E. R. BIRD.
FOUR HORSE EVENER.

No. 363,359. Patented May 24, 1887.

Witnesses:

Inventor:
Erasmus R. Bird
By Erwin & Benedict
Attorneys.

UNITED STATES PATENT OFFICE.

ERASMUS R. BIRD, OF ELGIN, MINNESOTA.

FOUR-HORSE EVENER.

SPECIFICATION forming part of Letters Patent No. 363,359, dated May 24, 1887.

Application filed August 4, 1885. Serial No. 173,524. (No model.)

*To all whom it may concern:*

Be it known that I, ERASMUS R. BIRD, a citizen of the United States, residing at Elgin, in the county of Wabasha and State of Minnesota, have invented certain new and useful Improvements in Four-Horse Eveners, of which the following is a full description, reference being had to the accompanying drawings, forming a part of this specification.

Four-horse eveners are used in connection with harvesting and binding machines, and when so used it is necessary that the eveners be so attached to the pole of the harvester or binder that three of the single whiffletrees are on one side of the pole, and one of the single whiffletrees is on the other side, whereby only one horse travels on that side of the pole next to the standing grain, thus obviating the trampling down of the grain which would take place if more than one horse traveled on the inside of the pole.

My invention consists in the peculiar construction and arrangement of the evener and whiffletrees, and the devices for connecting the evener with the pole of the harvester or binder.

Figure 1:
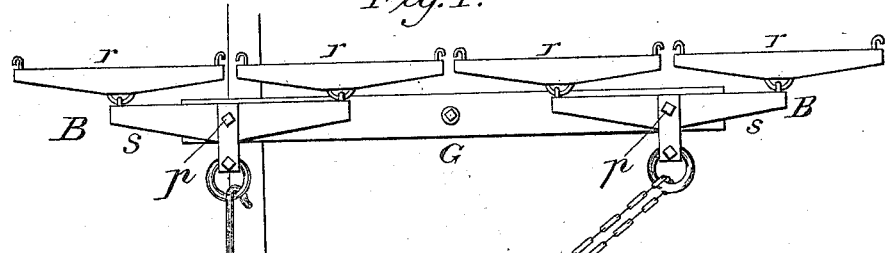
Figure 3:
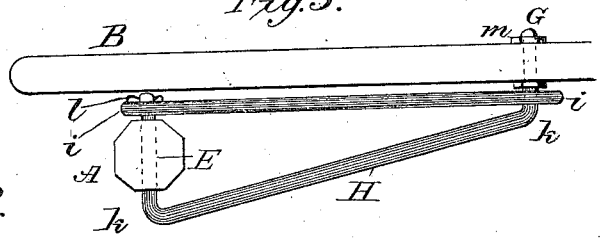
Figure 2:
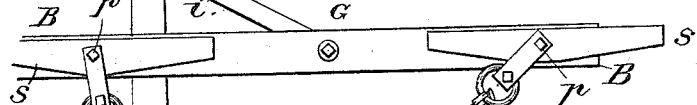
Figure 4:
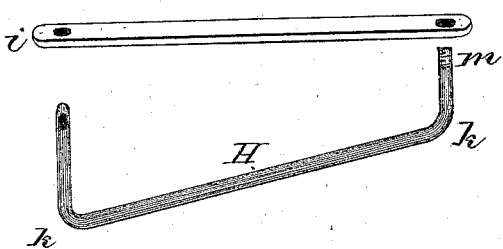

In the accompanying drawings, Figure 1 is a top view or plan of the device embodying my invention. Fig. 2 is a plan of the same device shown in Fig. 1, but in a different position, showing parts not seen in Fig. 1. Fig. 3 is a view from the rear of parts of the same device. Fig. 4 is a detail of parts separated from the device and from each other.

The same letters refer to like parts in all the views.

A is the pole of a harvester or binder.

B is the evener, on which are pivoted the double whiffletrees $s\ s$. The double whiffletrees $s\ s$ are pivoted centrally to the evener and equidistant from its middle point, G, and the four single whiffletrees, $r\ r$, are centrally movably attached to the double whiffletrees $s\ s$, one single whiffletree at each end of the double whiffletree. The evener B is attached to the pole A by the swinging arm H, which arm is pivoted at one end to the pole A, and at the other end is pivoted to the evener B at its middle point, G. This arm H, when the device is in use, projects outwardly from the side of the pole, and is of such length as to carry the evener so much to one side that the center of one of the double whiffletrees $s$ comes about over the pole, thus locating three of the single whiffletrees on one side of the pole. This arm H is preferably made in the form shown in Figs. 3 and 4, and is provided with a brace or staying rod, $i$, in the form and as shown in Figs. 3 and 4. A chain, D, is attached at both ends to the evener B, the respective ends of the chain being attached to the evener at points equidistant and on opposite sides from the central point, G, and preferably at the points, respectively, at which the double whiffletrees $s\ s$ are attached to the evener, as shown in Figs. 1 and 2. This chain D extends rearwardly, and passes over and about a pulley, C, which rotates on an arbor or axle affixed to the pole A in the rear of the point of attachment of the arm H. The chain D moves freely to right or left upon the pulley C for the purpose of adjustment and of equalizing the draft of the evener.

Ordinarily the device is so adjusted that the evener D is parallel with the arm H, projecting at right angles from the pole; but it is sometimes desirable to adjust the evener farther to the rear or front for adaptation to the team, and for that purpose the chain D at one end is provided with a hook, and is run through a ring attached to the evener, and is doubled back a little, as shown in Fig. 1, or more, as shown in Fig. 2, and made fast to itself, whereby the evener may be adjusted forward or back on the pole, as desired.

What I claim as new, and desire to secure by Letters Patent, is—

1. The pole A and the pulley C, attached thereto, in combination with the evener B, the arm H, pivoted to the pole and to the evener, and the chain D, attached to the evener B and running over the pulley C, substantially as described.

2. In devices for adjusting eveners, the evener B, in combination with chain D, provided at one end with a hook, which end of said chain is passed through a ring in the evener, and is doubled back and secured upon itself for the purpose of adjustment, and the pulley C, mounted on the pole to which the evener is attached, over which pulley the chain runs, substantially as described.

ERASMUS R. BIRD.

Witnesses:
WILLIAM H. FELLER,
WILLIAM T. ADAMS.